United States Patent
Wang et al.

(10) Patent No.: US 10,551,653 B2
(45) Date of Patent: Feb. 4, 2020

(54) BACKPLANE AND DISPLAY DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Na Wang, Shenzhen (CN); Cheng-Fa Chung, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/021,291

(22) Filed: Jun. 28, 2018

(65) Prior Publication Data
US 2019/0324314 A1    Oct. 24, 2019

(30) Foreign Application Priority Data
Apr. 23, 2018 (CN) .......................... 2018 1 0367883

(51) Int. Cl.
| | |
|---|---|
| *H05K 7/02* | (2006.01) |
| *H05K 7/04* | (2006.01) |
| *G02F 1/1333* | (2006.01) |
| *G02F 1/13357* | (2006.01) |

(52) U.S. Cl.
CPC ...... *G02F 1/133308* (2013.01); *G02F 1/1336* (2013.01); *G02F 2001/13332* (2013.01); *G02F 2001/133314* (2013.01); *G02F 2001/133317* (2013.01); *G02F 2001/133328* (2013.01)

(58) Field of Classification Search
USPC ........................................ 361/807, 809, 810
See application file for complete search history.

(56) References Cited

U.S. PATENT DOCUMENTS

| | | | |
|---|---|---|---|
| 8,956,033 B2* | 2/2015 | Poorter | G02F 1/133308 |
| | | | 362/602 |
| 9,835,791 B2* | 12/2017 | Zhao | G02B 6/0088 |
| 2006/0203141 A1* | 9/2006 | Lee | G02F 1/133308 |
| | | | 349/58 |
| 2006/0290836 A1* | 12/2006 | Chang | G02B 6/0088 |
| | | | 349/58 |
| 2010/0157543 A1 | 6/2010 | Shohet et al. | |
| 2013/0155717 A1* | 6/2013 | Jeong | G02F 1/133308 |
| | | | 362/602 |
| 2014/0132877 A1 | 5/2014 | Tsao et al. | |
| 2015/0362652 A1* | 12/2015 | Hayashi | G02B 6/005 |
| | | | 362/607 |
| 2016/0057872 A1* | 2/2016 | Park | G02B 6/0083 |
| | | | 362/611 |

* cited by examiner

*Primary Examiner* — Hung S. Bui
(74) *Attorney, Agent, or Firm* — ScienBiziP, P.C.

(57) ABSTRACT

A backplane for a display device includes a substrate layer, a first metal layer and a second metal layer. The first metal layer protrudes beyond the substrate layer and includes at least one transverse portion and at least one longitudinal portion extending from the transverse portion. The substrate layer is attached on the transverse portion. The second metal layer is attached on the transverse portion. An edge of the substrate layer and an edge of the second metal layer face the longitudinal portion. The longitudinal portion has a length that is greater than or equal to a thickness of the substrate layer and the second metal layer.

14 Claims, 2 Drawing Sheets

BACKPLANE AND DISPLAY DEVICE

FIELD

The subject matter generally relates to a backplane and a display device.

BACKGROUND

A television includes a display screen and a backplane. The backplane typically includes at least: a first metal layer, a substrate layer, and a second metal layer. The substrate layer typically has a honeycomb structure or a wave structure. Efforts are thus made to hide the substrate layer. Among conventional technologies, the substrate can be hidden by a front frame or a middle frame. The backplane and the middle frame are engaged by an adapting piece or a screw.

Thus, there is room for improvement in the art.

BRIEF DESCRIPTION OF THE DRAWINGS

Implementations of the present technology will now be described, by way of example only, with reference to the attached figures.

DETAILED DESCRIPTION OF EMBODIMENTS

Figure 1:
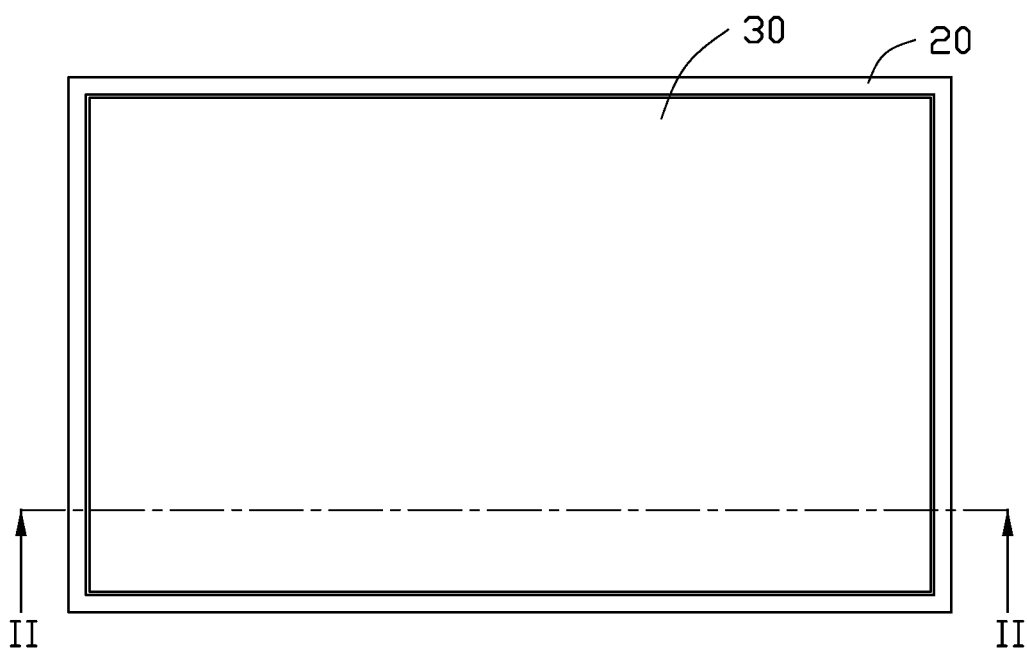
FIG. 1 is a front view of a first embodiment of a display device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
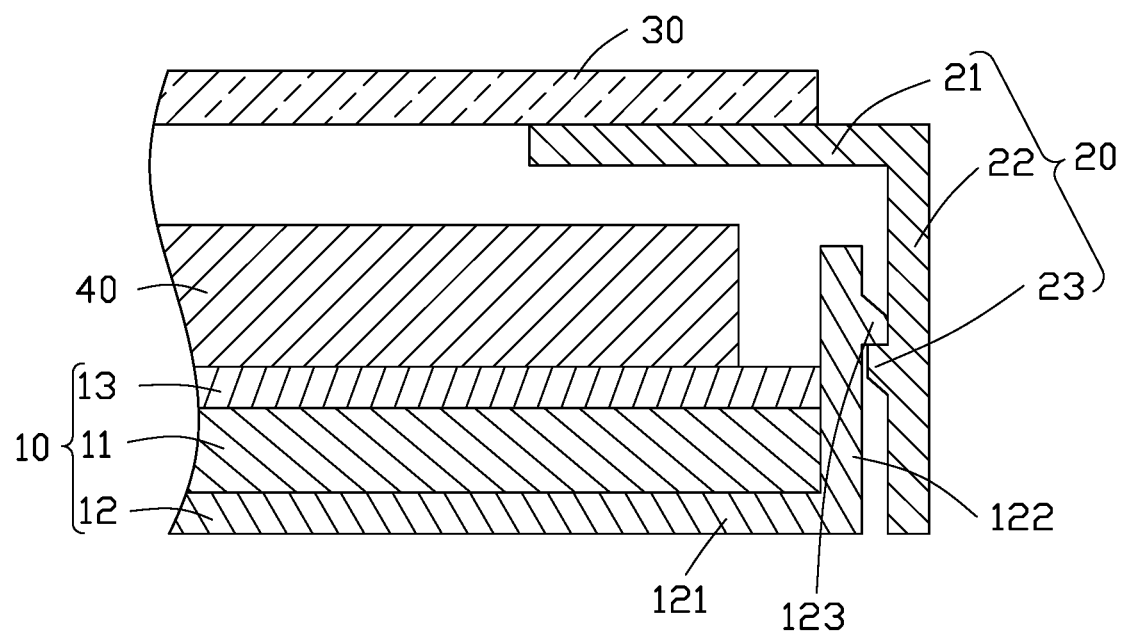
FIG. 2 is a cross-sectional view of the display device along line II-II of FIG. 1.

FIGS. 1-2 illustrate a first embodiment of a display device 100. The display device 100 includes a backplane 10, a frame 20, a display screen 30, and an optical module 40 (for example an LCD panel). The display screen 30 is attached to the frame 20. The backplane 10 and the frame 20 are engaged together. The optical module 40 is attached to on the backplane 10 and opposite to the display screen 30.

The backplane 10 includes a substrate layer 11, a first metal layer 12, and a second metal layer 13. The first metal layer 12 and the second metal layer 13 are both attached on two opposing surfaces of the substrate layer 11. The substrate layer 11 has a honeycomb structure or a wave structure.

The first metal layer 12 protrudes beyond the substrate layer 11 and the second metal layer 13.

The substrate layer 11 and the second metal layer 13 have a same size.

The first metal layer 12 includes at least one transverse portion 121 and at least one longitudinal portion 122. The transverse portion 121 and the longitudinal portion 122 are integrally formed. The longitudinal portion 122 extends from the transverse portion 121. The transverse portion 121 is perpendicular to the longitudinal portion 122. An edge of the substrate layer 11 and an edge of the second metal layer 13 face the longitudinal portion 122.

The longitudinal portion 122 has a length that is equal to or higher than a thickness of the substrate layer 11.

In at least one embodiment, the longitudinal portion 122 has a length that is greater than a sum of the thicknesses of the substrate layer 11 and of the second metal layer 13.

A first latching subassembly 123 is attached on the longitudinal portion 122. The first latching subassembly 123 is far away from the substrate layer 11 and the second metal layer 13.

The frame 20 includes a support portion 21 and a latching portion 22. The latching portion 22 is perpendicular to the support portion 21. The latching portion 22 and the support portion 21 are integrally formed. The latching portion 22 extends from the support portion 21.

A second latching subassembly 23 is attached on the latching portion 22. The second latching subassembly 23 is opposite to the first latching subassembly 123. The second latching subassembly 23 can be latched with the first latching subassembly 123 to latch the frame 20 and the backplane 10 together.

The display screen 30 is attached on the support portion 21. The display screen 30 can be a liquid crystal display or a plasma panel. In at least one exemplary embodiment, the display screen 30 is a liquid crystal display.

The optical module 40 provides light to illuminate the display screen 30.

The optical module 40 is attached on the second metal layer 13 and is opposite to the display screen 10.

With the above configuration, the backplane 10 of the display device 100 has a first metal layer 12. Firstly, the first metal layer 12 includes at least one transverse portion 121 and at least one longitudinal portion 122 extending from the transverse portion 121. The substrate layer 11 of the backplane 10 is attached on the transverse portion 121 and can be blocked by the longitudinal portion 122. Thus the backplane 10 obscures the substrate layer 11 and prevents it being exposed. The substrate layer 11 of the backplane 10 thus does not affect the appearance of the backplane 10 and the display device 100. Secondly, in the longitudinal portion 122 there is a first latching subassembly 123. In the latching portion 22 there is a second latching subassembly 23 that is matched with the first latching subassembly 123. So, the frame 20 and the backplane 10 can be latched together by the first latching subassembly 123 and the second latching subassembly 23. This arrangement reduces cost in relation to the backplane 10 and the display device 100.

The embodiments shown and described above are only examples. Many details are often found in the art such as the other features of the backplane and the display device. Therefore, many such details are neither shown nor described. Even though numerous characteristics and advantages of the present technology have been positioned forth in the foregoing description, together with details of the structure and function of the present disclosure, the disclosure is illustrative only, and changes can be made in the detail, including in matters of shape, size, and arrangement of the portions within the principles of the present disclosure, up to and including the full extent established by the broad general meaning of the terms used in the claims. It will therefore be appreciated that the embodiments described above can be modified within the scope of the claims.

What is claimed is:

1. A backplane comprising:
a substrate layer,
a first metal layer protruding beyond the substrate layer, wherein the first metal layer comprises at least one transverse portion and at least one longitudinal portion extending from the transverse portion, the substrate layer is attached on the transverse portion; and
a second metal layer being attached on the transverse portion; wherein an edge of the substrate layer and an edge of the second metal layer face the longitudinal portion, the longitudinal portion has a length that is greater than or equal to a thickness of the substrate layer and the second metal layer, and the longitudinal portion obscures and covers the substrate layer.

2. The backplane of claim 1, wherein the transverse portion and the longitudinal portion are integrally formed.

3. The backplane of claim 1, wherein the transverse portion is perpendicular to the longitudinal portion.

4. The backplane of claim 1, wherein the substrate layer and the second metal layer have a same size.

5. The backplane of claim 1, wherein a first latching subassembly is attached on the longitudinal portion.

6. A display device comprising:
a backplane, the backplane comprising:
a substrate layer,
a first metal layer protruding beyond the substrate layer, wherein the first metal layer comprises at least one transverse portion and at least one longitudinal portion extending from the transverse portion, the substrate layer is attached on the transverse portion; and
a second metal layer being attached on the transverse portion; wherein an edge of the substrate layer and an edge of the second metal layer face the longitudinal portion, the longitudinal portion has a length that is greater than or equal to a thickness of the substrate layer and the second metal layer, and the longitudinal portion obscures and covers the substrate layer.

7. The display device of claim 6, wherein the display device further comprises a frame, the frame includes a second latching subassembly, the backplane further comprises a first latching subassembly, the second latching subassembly is matched with the first latching subassembly to latch the frame and the backplane together.

8. The display device of claim 7, wherein the first latching subassembly is attached on the longitudinal portion.

9. The display device of claim 7, wherein the frame comprises a support portion and a latching portion on the support portion, the second latching subassembly is attached on the latching portion.

10. The display device of claim 9, wherein the latching portion and the support portion are integrally formed.

11. The display device of claim 9, wherein the latching portion is perpendicular to the support portion.

12. The display device of claim 9, wherein the latching portion extends from the support portion.

13. The display device of claim 9, wherein the display device further comprises a display screen, the display screen is attached on the support portion.

14. The display device of claim 13, wherein the display device further comprises an optical module, the optical module is attached on the second metal layer and is opposite to the display screen.

* * * * *